(12) United States Patent
Osovets

(10) Patent No.: US 6,442,272 B1
(45) Date of Patent: Aug. 27, 2002

(54) VOICE CONFERENCING SYSTEM HAVING LOCAL SOUND AMPLIFICATION

(75) Inventor: Alexander Osovets, Ashburn, VA (US)

(73) Assignee: Tellabs, Inc., Naperville, IL (US)

( * ) Notice: Subject to any disclaimer, the term of this patent is extended or adjusted under 35 U.S.C. 154(b) by 0 days.

(21) Appl. No.: 09/084,677

(22) Filed: May 26, 1998

(51) Int. Cl.$^7$ .............................................. H04M 1/00
(52) U.S. Cl. ............................ 379/406.01; 379/406.04
(58) Field of Search ................................ 379/288, 388, 379/406, 409, 410, 406.01, 406.04

(56) References Cited

U.S. PATENT DOCUMENTS

| | | | |
|---|---|---|---|
| 3,992,586 A | 11/1976 | Jaffe | 381/83 |
| 4,636,586 A | 1/1987 | Schiff | 379/406.08 |
| 5,027,393 A | 6/1991 | Yamamura et al. | 379/406.06 |
| 5,297,210 A | 3/1994 | Julstrom | 381/66 |
| 5,404,397 A | 4/1995 | Janse et al. | 379/202.01 |
| 5,668,794 A | * 9/1997 | McCaslin et al. | 379/288 |
| 5,848,146 A | * 12/1998 | Slattery | 379/406 |

* cited by examiner

Primary Examiner—Forester W. Isen
Assistant Examiner—Jefferey Harold

(74) Attorney, Agent, or Firm—John B. Berryhill; Dann Dorfman Herrell & Skillman

(57) ABSTRACT

A teleconferencing system having an echo canceller is configured for use at a large near-end conference location having a loudspeaker for acoustic reproduction of a received far-end telecommunication signal, a plurality of microphones and local acoustic amplification of the signals produced by the microphones. At least one first microphone is located relative to the loudspeaker such that the acoustic delay time between the loudspeaker and the first microphone is less than or equal to the tail length of the echo canceller. At least one second microphone is located relative to the loudspeaker such that the acoustic delay time between the loudspeaker and the second microphone is greater than the tail length of the echo canceller. Signals from the first and second microphones are provided to a mixer and are mixed to provide a send-input signal to the echo canceller. The echo canceller is configured to remove an echo component from the send-input signal, thereby to provide a send-output signal for transmission to a far-end location. A gate is provided between the second microphone and the mixer for selectively interrupting or attenuating the second microphone signal during periods when the near-end acoustic signal substantially consists of far-end speech. The gate may be configured to selectively connect the second microphone with the mixer when the second microphone signal exceeds a predetermined or adaptive threshold based on the amplitude of the far-end telecommunication signal.

11 Claims, 1 Drawing Sheet

VOICE CONFERENCING SYSTEM HAVING LOCAL SOUND AMPLIFICATION

FIELD OF THE INVENTION

The present invention relates to an audio communication terminal for conducting a hands-free telephonic conference. In particular the present invention relates to such a terminal configured to permit conference participants at the location of the terminal to be physically separated by an acoustic distance greater than the tail length of an echo canceller provided in the terminal.

BACKGROUND

Audio conferencing systems are popular tools for conducting telephonic conversations among multiple participants. Early generations of speakerphones included a microphone for picking up near-end speech, a loudspeaker for reproducing far-end speech, and a voice switch or gain switch. The function of the voice switch is to disable the microphone during reception of far-end speech, in order to prevent the microphone from picking up the loudspeaker and re-transmitting the far-end speech as echo. Such an arrangement was unsatisfactory to many users because the switch would often cause undesirable clipping of speech signals and prevented simultaneous, or full-duplex, conversation. The relatively recent availability of inexpensive digital signal processing technology has rendered it economically feasible to provide full-duplex conferencing terminals by employing an adaptive echo canceller instead of a voice switch. The echo canceller estimates the echo signal that will result from a received far-end signal and subtracts the estimated echo signal from the microphone signal in order to cancel the echo component of the microphone signal prior to transmission to the far-end. Such full-duplex terminals have been developed for compatible use with traditional telephone networks and for conducting voice conversations via digital data transmission systems.

An important design parameter of an echo canceller is the period of time in which the echo canceller is operative to detect that a microphone signal includes an echo component. In order to detect echo, and to develop a model of the impulse response of the echo path, the echo canceller maintains a register containing stored samples of the received far-end communication signal. The size of this register establishes a time period, known as the "tail length" of the canceller, over which the echo canceller will develop a model of the echo path and apply echo cancellation.

If an echo canceller is deployed in a room wherein a microphone is positioned at an acoustic distance from the loudspeaker that exceeds the tail length of the canceller, then the canceller will fail to recognize signals from that microphone as comprising an echo component. Consequently, the echo path model may become distorted as the echo canceller attempts to adapt the model on the basis of signals that are not correctly identified as echo signals. The potential distortive effect of deploying the conferencing system in a large room will be exacerbated by local amplification of the near-end speech signals, which is desirable in large rooms in order to ensure that the near-end conference participants are able to clearly able to hear one another. Hence, the combined factors of increased room size and near-end speech amplification can combine to cause poor echo canceller performance. Although an echo canceller having a long tail length could be provided, at added expense, it would be desirable to provide an audio conferencing system that could readily configured to function in large and small rooms, and which would provide for local sound amplification without significantly detracting from echo canceller stability.

SUMMARY OF THE INVENTION

In accordance with the present invention, an audio conferencing system includes a first loudspeaker for reproducing received far-end audio signals and a second loudspeaker for reproducing amplified near-end audio signals. Near-end audio signals are provided to the audio conferencing system by at least two microphones, to permit conference participation by a plurality of near-end participants. The first microphone, or a first group of microphones, is positioned relative to the first loudspeaker such that the acoustic time delay for signals transmitted from the first loudspeaker to the first microphone is less than the tail length of the echo canceller. A second microphone, or a second group of microphones, is positioned relative to the first loudspeaker such that the acoustic time delay for signals from the first loudspeaker to the second microphone is longer than the tail length of the echo canceller. Signals from the first and second microphones are combined by an audio mixer to provide a near-end input signal to an echo canceller, and as an input signal to the second loudspeaker. The second microphone signal is selectively gated to the mixer, such that second microphone signal is provided to the mixer only during periods of near-end speech. Hence, adaptation of the echo canceller is determined by the signal from the first microphone, which is positioned within a distance from the first loudspeaker defined by the tail length of the echo canceller.

BRIEF DESCRIPTION OF THE FIGURES

The foregoing summary as well as the following detailed description will be best understood when read in conjunction with the attached drawings in which.

DETAILED DESCRIPTION

Figure 1:
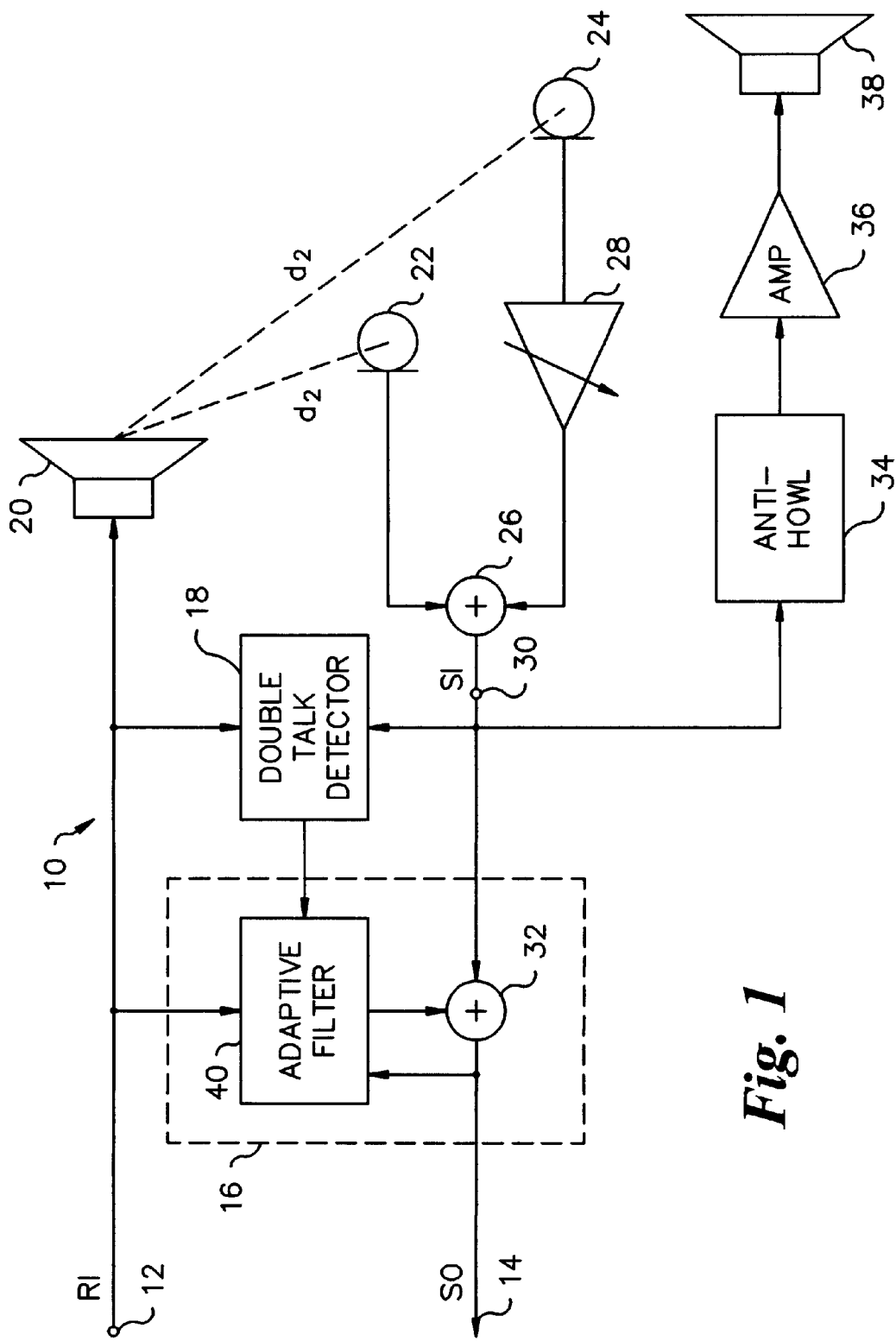
FIG. 1 is block diagram of a voice conferencing system in accordance with the present invention.

Referring now to FIG. 1, there is shown an audio conferencing system 10. For purposes of description, the location of audio conferencing system 10 shall herein be referred to as the "near-end." Audio conferencing system 10 includes a receive-in terminal 12 for receiving a receive-in (RI) signal from a far-end communication source, and a send-out terminal 14 for transmitting a send-out (SO) signal from the near-end to the far-end. The receive-in signal at terminal 12 is provided as an input signal to an echo canceller 16, a double-talk detector 18 and a loudspeaker 20. The loudspeaker 20 may include an amplifier (not shown) for providing suitable amplification of the RI signal at the near-end location where the conferencing system 10 is installed.

Audio conferencing system 10 further includes a plurality of microphones. For example, there may be one or more microphones, such as microphone 22, positioned within a distance d, of the loudspeaker 20, such that the acoustic delay time between the loudspeaker 20 and the microphone 22 is less than or equal to the tail length of the echo canceller 16. Other microphones may be positioned at a greater distance from the loudspeaker 20. In FIG. 1, a second microphone 24 is shown to be located at a distance $d_2$ from the loudspeaker 20, such that the acoustic delay time for propagation of audio signals from the loudspeaker 20 to the microphone 24 exceeds the tail length of the echo canceller 16.

Microphones 22 and 24 are connected with an audio mixer 26. A gate is connected between microphone 24 and the mixer 26 for selectively providing signals from the microphone 24 to the mixer 26 in a manner described in more detail below. Mixer 26 combines the input signal from microphone 22 and the gated input signal from microphone 24 to provide a send-input (SI) signal at terminal 30. The SI signal is provided as an input to double talk to double talk detector 18, echo canceller 16, and an anti-howling filter 34.

The anti-howling filter 34 is connected to receive the SI signal from terminal 30 and to provide a filtered SI signal to amplifier 36, which is further connected with loudspeaker 38. The loudspeaker 38 provides a local amplified near-end acoustic speech signal, so that the near-end conference participants can hear one another. Such local acoustic amplification is desirable where, for example, the near-end participants are sufficiently physically separated so as to require local amplification in order to hear one another, as in an auditorium. The anti-howling filing 34 may comprises a known type of filter, such as a resonant notch filter, frequency shifting filter, or other variety of anti-howling device configured for substantially eliminating howling due to feedback of the signal from loudspeaker 38 into the microphones 22 and/or 24.

The echo canceller 16 is connected to receive the SI signal from terminal 30. The echo canceller includes an adaptive filter 40, and a summing junction 32. The adaptive filter 40 produces an estimated echo signal on the basis of the RI signal received from terminal 12, and an adaptive model of the local echo path. The estimated echo signal is subtracted from the SI signal as shown at summing junction 32, to provide a send-output (SO) signal. The SO signal is also provided as a feedback input to the adaptive filter 40, so that the echo path model can be adapted on the basis of the remaining SO signal. A double-talk detector 18 is connected between terminal 12 and terminal 30, for determining, on the basis of the RI and SI signals, whether the SI signal consists of primarily near-end speech, echo, or a combination of near-end speech and echo. The double-talk detector may embody any known double-talk detection arrangement, such as an amplitude comparison of the RI and SI signals. The double-talk detector provides a control signal to the adaptive filter 40, which is responsive to modify the echo path model only during periods when the double-talk detector has determined that the SI signal consists primarily of echo. For example, the double-talk detector may make such a determination when the amplitude of the RI signal exceeds the SI signal by a predetermined margin. During such periods of far-end speech, the adaptive filter is operative to continuously determine a set of convolution coefficients by which to transform the RI signal to produce an estimated echo signal that will minimize the SO signal.

In order to prevent the adaptive filter 40 from falsely adapting in response to echo signals beyond the tail length of the adaptive filter 40, gate 28 is configured to interrupt, or substantially attenuate, transmission of signals from microphone 24 to the audio mixer 26 during periods of primarily far-end speech (i.e. during periods when the adaptive filter 40 is operative to update the convolution coefficients). In one embodiment, the gate 28 may comprises a thresholding filter, which passes signals from the microphone 24 to the mixer 26 during periods of time when the signal from the microphone 24 exceeds a predetermined threshold. The predetermined threshold may be chosen as substantially an expected signal from microphone 24 that would be generated in response to a selected amplitude, such as the maximum amplitude, of far-end speech reproduced by the loudspeaker 20. In such an embodiment, signals from the microphone 24 would be prevented from contributing to the SI signal when the near-end signal component of the acoustic input to the microphone 24 did not exceed the maximum echo component. In an alternative embodiment, the gate 28 may be connected to receive the RI signal in order to set an adaptive threshold based on the present amplitude of incoming far-end speech signals. In such an embodiment, the gate 28 would open to transmit the signal from microphone 24 to the mixer in response to a relatively low acoustic input signal to microphone 24 when the RI signal amplitude is relatively low. Conversely, when the RI signal amplitude is relatively high, the threshold amplitude required to open the gate 28 would be proportionately increased.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

That which is claimed is:

1. A teleconferencing apparatus, comprising:
   a receive-input terminal connected to receive telecommunication signals from a far-end source;
   a first loudspeaker connected with the receive-input terminal for producing a near-end acoustic signal in response to the telecommunication signals from the far-end;
   a send-output terminal connected to transmit telecommunication signals to the far-end;
   an echo canceller connected between the receive-input terminal and the receive output terminal, the echo canceller having a send-input terminal and a characteristic tail length;
   a first microphone positioned relative to the first loudspeaker such that the acoustic delay time between the first loudspeaker and the first microphone is less than or equal to the tail length of the echo canceller;
   a second microphone positioned relative to the first loudspeaker such that the acoustic delay time between the first loudspeaker and the second microphone is greater than the tail length of the echo canceller;
   a mixer connected with the first microphone and with the second microphone for mixing respective microphone signals generated by the first and second microphones, and connected to provide a mixed signal to the send-input terminal of the echo canceller;
   a gate connected between the second microphone and the mixer for selectively providing signals from the second microphone to the mixer during periods of near-end speech.

2. The apparatus of claim 1, further comprising a second loudspeaker connected with the send-input terminal for producing a near-end acoustic signal.

3. The apparatus of claim 2, further comprising a double-talk detector connected between the receive-input terminal and the send-input terminal for detecting a double-talk condition, and responsive thereto for providing an adaptation control signal to the echo canceller.

4. The apparatus of claim 2, further comprising an anti-howl filter connected between the send-input terminal and the second loudspeaker.

5. The apparatus of claim 1, wherein the gate is configured to connect the second microphone with the mixer when the second microphone signal exceeds a predetermined threshold.

6. The apparatus of claim 5 wherein the threshold is corresponds to a signal amplitude generated by the second microphone corresponding substantially to a maximum near-end acoustic signal produced by the first loudspeaker.

7. The apparatus of claim 1, wherein the gate is configured to connect the second microphone with the mixer when the second microphone signal exceeds an adaptive threshold determined by the amplitude of the far-end telecommunication signal.

8. The apparatus of claim 1 comprising a plurality of first microphones connected with the mixer and positioned relative to the first loudspeaker such that the acoustic delay time between the first loudspeaker and any of the first microphones is less than or equal to the tail length of the echo canceller, a plurality of second microphones connected with the mixer and positioned relative to the first loudspeaker such that the acoustic delay time between the first loudspeaker and any of the second microphones is greater than or equal to the tail length of the echo canceller, and wherein the gate comprises means for selectively connecting any of the second microphones with the mixer during periods of near-end speech.

9. A method of operating a teleconferencing apparatus having an echo canceller with a characteristic tail length, the method comprising steps of:

receiving a telecommunication signal from a far-end terminal;

reproducing the telecommunication at a near-end loudspeaker as an acoustic reproduction of the far end signal;

positioning a first microphone relative to the loudspeaker such that the acoustic delay time between the first microphone and the first loudspeaker is less than or equal to the tail length of the echo canceller;

positioning a second microphone relative to the loudspeaker such that the acoustic delay time between the second microphone and the first loudspeaker is greater than the tail length of the echo canceller;

mixing signals produced by the first and second microphones to provide a send-input signal to the echo canceller, said mixing step comprising the step of selectively mixing the second microphone signal so as to substantially attenuate the second microphone signal when the second microphone signal is below a selected threshold.

10. The method of claim 9, comprising the step of selecting said selected threshold as a signal level generated by the second microphone signal in response to a substantial maximum value of the telecommunication signal received from the far-end terminal.

11. The method of claim 9, comprising the step of varying said selected threshold on a continuous basis in response to a present amplitude of the telecommunication signal received from the far end terminal.

* * * * *